(12) United States Patent
Kasahara et al.

(10) Patent No.: US 11,435,518 B2
(45) Date of Patent: Sep. 6, 2022

(54) COATED OPTICAL FIBER AND OPTICAL FIBER CABLE

(71) Applicant: FURUKAWA ELECTRIC CO., LTD., Tokyo (JP)

(72) Inventors: Minoru Kasahara, Tokyo (JP); Yoshihiro Arashitani, Tokyo (JP); Kouji Mochiduki, Tokyo (JP); Masahiro Yabe, Tokyo (JP)

(73) Assignee: FURUKAWA ELECTRIC CO. LTD., Tokyo (JP)

( * ) Notice: Subject to any disclaimer, the term of this patent is extended or adjusted under 35 U.S.C. 154(b) by 0 days.

(21) Appl. No.: 17/200,458

(22) Filed: Mar. 12, 2021

(65) Prior Publication Data
US 2021/0199883 A1   Jul. 1, 2021

Related U.S. Application Data

(63) Continuation of application No. PCT/JP2019/035634, filed on Sep. 11, 2019.

(30) Foreign Application Priority Data

Sep. 13, 2018   (JP) .............................. JP2018-171881

(51) Int. Cl.
*G02B 6/02* (2006.01)
*C03C 25/105* (2018.01)
*C03C 25/1065* (2018.01)

(52) U.S. Cl.
CPC ........ *G02B 6/02019* (2013.01); *C03C 25/105* (2013.01); *C03C 25/1065* (2013.01); *G02B 6/02395* (2013.01)

(58) Field of Classification Search
CPC .................................................. G02B 6/02019
See application file for complete search history.

(56) References Cited

U.S. PATENT DOCUMENTS 4,690,503 A * 9/1987 Janssen ................ C03C 25/1065
                                                           385/128
6,804,442 B1 * 10/2004 Watanabe .......... G02B 6/02395
                                                           385/128

(Continued)

FOREIGN PATENT DOCUMENTS

CN         1457328 A      11/2003
CN       101346654 A       1/2009

(Continued)

OTHER PUBLICATIONS

Kashara et al., A Method Related to Adhesion of Glass / Primary Interface for Long-term Reliability, Furukawa Review, No. 45 20144 (Year: 2014).*

(Continued)

*Primary Examiner* — Peter Radkowski
(74) *Attorney, Agent, or Firm* — Masuvalley & Partners; Peter R. Martinez

(57) ABSTRACT

Provided is a coated optical fiber and an optical fiber cable capable of suppressing transmission loss (microbend loss) even in an optical fiber having high microbend sensitivity. In the present invention, the degree of freedom of a primary layer 11 represented by the equation (I) and the rigidity of a secondary layer 12 represented by the equation (II) are set in specific ranges, respectively. Thus, the present invention provides a coated optical fiber 1 capable of suppressing the transmission loss even when an optical fiber 10 having high microbend sensitivity such as a BI fiber having a large effective core cross-sectional area $A_{\it{eff}}$ of an optical fiber is used. The present invention can be widely used as a coated optical fiber 1 constituting a coated optical fiber ribbon or as a coated optical fiber 1 housed in an optical fiber cable. Further, an optical fiber cable including such coated optical fibers 1 enjoys the effect of the above-described coated optical fiber 1.

(Continued)

[Math. 1]

$$\beta_P \times P_{ISM} \geq 600 \quad (\mathrm{I})$$

$$(S/P) \times (S_{ISM}/P_{ISM}) \leq 1{,}000 \quad (\mathrm{II})$$

6 Claims, 1 Drawing Sheet

(56) References Cited

U.S. PATENT DOCUMENTS

| | | | |
|---|---|---|---|
| 2004/0022510 A1* | 2/2004 | Suzuki | G02B 6/4403 385/128 |
| 2006/0088263 A1 | 4/2006 | Tanaka et al. | |
| 2008/0112676 A1 | 5/2008 | Nakajima et al. | |
| 2013/0071115 A1 | 3/2013 | Bennett et al. | |
| 2013/0266281 A1 | 10/2013 | Tanaka et al. | |
| 2017/0153389 A1 | 6/2017 | Chen et al. | |

FOREIGN PATENT DOCUMENTS

| | | |
|---|---|---|
| CN | 103229083 A | 7/2013 |
| JP | H0611634 A | 1/1994 |
| JP | 2004-059420 A | 2/2004 |
| JP | 2004-264369 A | 9/2004 |
| JP | 2014-530374 A | 11/2014 |
| WO | WO2002/066390 A1 | 8/2002 |

OTHER PUBLICATIONS

WIPO, Japanese International Search Authority, International Search Report (with English translation) and Written Opinion dated Dec. 3, 2019 in International Patent Application No. PCT/JP2019-035634, 8 pages.

Nakajima, Y. et al., "Measuring method of thermal strain and thermal stress generated in the optical fiber coating layer, A Study for Estimating Thermal Strain and Residual Stress in Optical Fiber Coatings," *Furukawa Electric Time Signal* No. 122, Sep. 2008, pp. 8-12 (with English translation, 13 pages).

WIPO, Japanese International Search Authority, Written Opinion (with English translation) dated Dec. 3, 2019 in International Patent Application No. PCT/JP2019/035634, 7 pages.

EPO, European Search Report dated May 9, 2022 in European Application No. 19860490.2, 6 pages.

CNIPO, Chinese Office Action dated Jun. 8, 2022 in Chinese Application No. 201980058384.3, 6 pages, with English translation, 8 pages.

* cited by examiner

COATED OPTICAL FIBER AND OPTICAL FIBER CABLE

RELATED APPLICATIONS

This application is a continuation of and claims priority to International Patent Application No. PCT/JP2019/035634, International Filing Date Sep. 11, 2019, entitled Optical Fiber Core Wire And Optical Fiber Cable, which claims priority to Japanese Application No. 2018-171881 filed Sep. 11, 2019, both of which are hereby incorporated herein by reference in their entireties.

TECHNICAL FIELD

The present invention relates to a coated optical fiber and an optical fiber cable. More specifically, the present invention relates to a coated optical fiber and an optical fiber cable capable of suppressing transmission loss (microbend loss) due to microbend.

BACKGROUND ART

In recent years, with the spread of the Internet, FTTH (Fiber To The Home), which realizes high-speed communication services by directly drawing optical fibers into ordinary households, is rapidly expanding.

In optical fibers, transmission loss (optical transmission loss) increases due to various external stresses and microbend generated thereby, and in order to reduce the transmission loss of the optical fibers, improvement in the microbend resistance of the optical fibers has been demanded. In order to protect the optical fibers from external stress, on an optical fiber such as a glass optical fiber, at least two coating layers such as a primary layer (also called a primary coating layer) and a secondary layer (also called a secondary coating layer) are formed, and this is used as a coated optical fiber.

In order to suppress the transmission loss caused by microbend (equated with "microbend loss" in the present invention, the same applies hereinafter) by forming such coating layers, it has been common to reduce the elastic modulus of the primary layer and increase the elastic modulus of the secondary layer. In addition, in order to reduce the coating thicknesses of the coating layers in the optical fiber in order to attain high density and high fiber count in an optical cable, and compensate for the lateral pressure characteristics and the like, a technology that further increases the elastic modulus (Young's modulus) of the secondary layer is provided (see, for example, Patent Literature 1 and the like).

CITATION LIST

Patent Literature

Patent Literature 1: JP 6-11634 A ([Claim 2] to [Claim 4], etc.)

SUMMARY OF INVENTION

However, for example, in an optical fiber having high microbend sensitivity such as a BI (Bend insensitive) fiber having a large effective core cross-sectional area $A_{eff}$ of an optical fiber, it has been difficult to suppress the transmission loss only by adjusting the elastic modulus as described in in Patent Literature 1 described above.

The present invention has been made in view of the above problem, and provides a coated optical fiber and an optical fiber cable capable of suppressing transmission loss (microbend loss) even in an optical fiber having high microbend sensitivity.

Solution to Problem

In order to solve the above problem, according to the present invention, there is provided a coated optical fiber in which a primary layer that covers an optical fiber is formed around the optical fiber, and a secondary layer that covers the primary layer is formed around the primary layer, the primary layer and the secondary layer being formed in this order, wherein, when a coating thickness of the primary layer is P (μm),
a coating thickness of the secondary layer is S (μm),
a thermal expansion coefficient of the primary layer is $\beta_P$ (/K),
an elastic modulus (primary elastic modulus) of the primary layer is $P_{ISM}$ (MPa), and
an elastic modulus (secondary elastic modulus) of the secondary layer is $S_{ISM}$ (MPa), a relationship of the following equations (I) and (II) is established.

[Math. 1]

$$\beta_P \times P_{ISM} \geq 600 \tag{I}$$

$$(S/P) \times (S_{ISM}/P_{ISM}) \leq 1{,}000 \tag{II}$$

In the coated optical fiber according to the present invention, in the above-mentioned present invention, an effective core cross-sectional area $A_{eff}$ of the optical fiber is larger than 100 μm².

In the coated optical fiber according to the present invention, in the above-mentioned present invention, a ratio (S/P) of the coating thickness S of the secondary layer to the coating thickness P of the primary layer is less than 1.

In the coated optical fiber according to the present invention, in the above-mentioned present invention, the elastic modulus (secondary elastic modulus) $S_{ISM}$ of the secondary layer is 2,000 MPa or less.

According to the present invention, there is provided an optical fiber cable including the coated optical fiber according to the above-mentioned present invention.

Advantageous Effects of Invention

In the present invention, the degree of freedom of a primary layer represented by the equation (I) and the rigidity of a secondary layer represented by the equation (II) are set in specific ranges, respectively. Thus, the present invention provides a coated optical fiber capable of suppressing the transmission loss (microbend loss) even when an optical fiber having high microbend sensitivity such as a BI fiber having a large effective core cross-sectional area $A_{eff}$ of an optical fiber is used.

Further, an optical fiber cable including the coated optical fibers according to the present invention enjoys the effect of the above-described coated optical fiber.

DESCRIPTION OF EMBODIMENTS

Hereinafter, one aspect of the present invention will be described. In a coated optical fiber 1 according to the present invention, at least two coating layers (primary layer 11 and secondary layer 12) that cover an optical fiber 10 are formed around the optical fiber 10.

Figure 1:
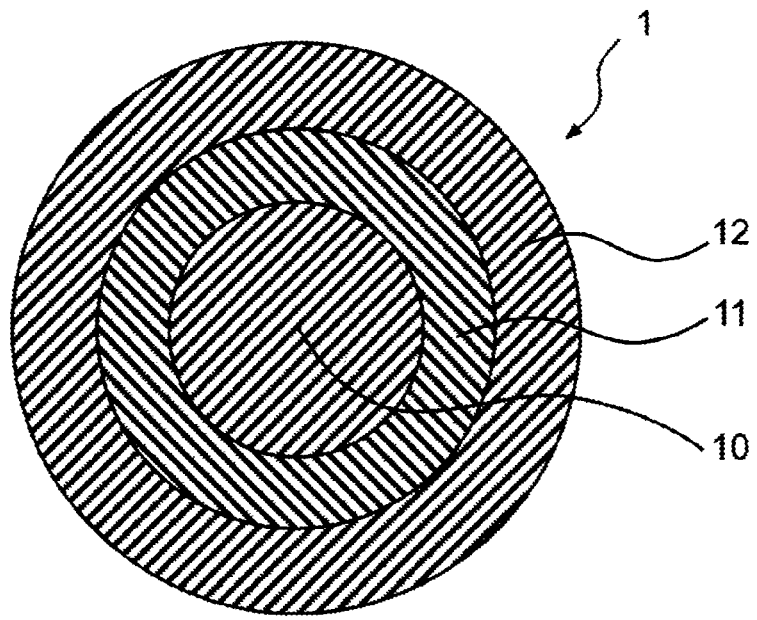
FIG. 1 is a cross-sectional view showing an example of the structure of a coated optical fiber.

(1) Structure of Coated Optical Fiber 1:

FIG. 1 is a cross-sectional view showing an example of the structure of the coated optical fiber 1. In FIG. 1, reference symbol 1 is a coated optical fiber, reference symbol 10 is an optical fiber, reference symbol 11 is a primary layer (primary coating layer), and reference symbol 12 is a secondary layer (secondary coating layer).

In the configuration of FIG. 1, the primary layer (primary coating layer) 11 is formed around the optical fiber 10, and the secondary layer (secondary coating layer) 12 is formed around the primary layer 11. Since the transmission loss of the optical fiber 10 increases due to various external stresses and microbend generated by the external stresses, it is necessary to protect the optical fiber 10 from such external stresses, and generally, as a protective layer, a coating having a two-layer structure including the primary layer 11 and the secondary layer 12 is applied.

The optical fiber 10 such as a glass optical fiber is not particularly limited, but in the present invention, an optical fiber 10 having high microbend sensitivity such as a BI (Bend insensitive) fiber having a large effective core cross-sectional area $A_{eff}$ (described later in detail) of an optical fiber can be preferably used.

For example, when the optical fiber 10 is a glass optical fiber, the primary layer 11 is an inner layer that comes into contact with silica glass constituting the glass optical fiber, and generally, soft resin having a relatively low elastic modulus is used. Generally, a secondary layer 12 using hard resin having a relatively large elastic modulus is coated on an outer layer of the primary layer 11 is used.

As the constituent materials of the primary layer 11 and the secondary layer 12, ultraviolet curable resin, for example, oligomer, diluting monomer, photoinitiator, silane coupling agent, sensitizer, lubricant, and the components of the various additives described above can be preferably used (the additives are not limited to these, and conventionally known additives and the like used for the ultraviolet curable resin and the like can be widely used). For example, as the oligomer, conventionally known materials such as polyether-based urethane acrylate, epoxy acrylate, polyester acrylate, silicone acrylate, or the like can be used. Further, as the diluting monomer, monofunctional monomer, polyfunctional monomer, or the like can be used.

In the coated optical fiber 1 according to the present invention, regarding the primary layer 11 and the secondary layer 12, when the coating thickness of the primary layer 11 is P (μm), the coating thickness of the secondary layer 12 is S (μm), the thermal expansion coefficient of the primary layer 11 is $\beta_P$ (/K), the elastic modulus (primary elastic modulus) of the primary layer 11 is $P_{ISM}$ (MPa), and the elastic modulus (secondary elastic modulus) of the secondary layer 12 is $S_{ISM}$ (MPa), the relationship of the following equations (I) and (II) is established.

[Math. 2]

$$\beta_P \times P_{ISM} \geq 600 \quad \text{(I)}$$

$$(S/P) \times (S_{ISM}/P_{ISM}) \leq 1{,}000 \quad \text{(II)}$$

First, the equation (I) is the product of the thermal expansion coefficient $\beta_P$ of the primary layer 11 and the elastic modulus $P_{ISM}$ of the primary layer 11, and is an index of the degree of freedom (movability) of the primary layer 11 (the unit is MPa/K, but it is not specifically defined in the equation (I)). If the degree of freedom determined by the equation (I) is large and the primary layer 11 is easy to move inside the coated optical fiber 1 (between the optical fiber 10 and the secondary layer 12), even when slight bending occurs in the coated optical fiber 1, the slight bending can be alleviated by the primary layer 11. As a result, it becomes difficult to transmit slight bending behavior to the optical fiber 10, so that transmission loss (microbend loss) can be suppressed.

In the present invention, as indicated by the equation (I), by setting the degree of freedom to 600 MPa/K or more (≥600 MPa/K), the mobility of the primary layer 11 becomes appropriate and the transmission loss can be suppressed. On the other hand, when the degree of freedom is less than 600 MPa/K, the primary layer 11 becomes difficult to move, and when slight bending occurs in the coated optical fiber 1, it becomes difficult to alleviate the slight bending by the primary layer 11, so that the transmission loss becomes large. The degree of freedom represented by the equation (I) is preferably 600 to 7,500 MPa/K.

Next, the equation (II) is the product of the coating thickness ratio (S/P) and the elastic modulus ratio ($S_{ISM}/P_{ISM}$) with respect to the primary layer, and represents the rigidity of the secondary layer 12. The degree of freedom (movability) of the primary layer 11 is as described above, but when the rigidity of the secondary layer 12 determined by the equation (II) is relatively large, the primary layer 11 which is the inner layer of the secondary layer 12 becomes difficult to move, and when slight bending occurs in the coated optical fiber 1, it becomes difficult to alleviate the slight bending of the optical fiber 10 by the primary layer 11. Therefore, the rigidity of the secondary layer 12 represented by the equation (II) needs to be suppressed to a certain level.

In the present invention, as indicated by the equation (II), the rigidity of the secondary layer 12 is set to 1,000 or less (≤1,000) so that the mobility of the internal primary layer 11 can be appropriately maintained. Therefore, stress can be released to the secondary layer 12 instead of the optical fiber 10, so that the transmission loss can be suppressed. On the other hand, if the rigidity exceeds 1,000, it becomes difficult to bend the secondary layer 12, so that the primary layer 11 may become difficult to move. Therefore, when slight bending occurs in the coated optical fiber 1, it becomes difficult to alleviate the slight bending by the primary layer 11, so that the transmission loss becomes large. The rigidity of the secondary layer 12 represented by the equation (II) is preferably 25 to 1,000.

Regarding the relationship between the degree of freedom of the primary layer 11 and the transmission loss (microbend loss) determined by the equation (I), it is considered that the transmission loss becomes smaller as the degree of freedom is large because the primary layer 11 is easy to move. Further, in the case of the coated optical fiber 1 in which the degree of freedom of the primary layer 11 and the rigidity of the secondary layer 12 determined by the equation (II) are within the above range, in the range where the rigidity of the secondary layer 12 represented by the equation (II) is expressed on the horizontal axis and the degree of freedom of the primary layer 11 represented by the equation (I) is expressed on the vertical axis, the degree of freedom of the primary layer 11 tends to decrease as the rigidity of the secondary layer 12 increases.

In the present invention, regarding the suppression of the transmission loss, criterions (1.0 dB/km or less or 0.1 dB/km or less, described later in detail) of the loss level of the transmission loss at the wavelength of 1,550 nm determined according to the difference in the effective core cross-sectional area $A_{eff}$ (described later) are given, and with these criterions as guides, the degree of freedom of the primary layer 11 is selected based on the relationship between the degree of freedom of the primary layer 11 and the transmission loss described above, and the rigidity of the secondary layer 12 selected accordingly is selected as the range described above.

The thermal expansion coefficient $\beta_P$ of the primary layer 11 is preferably 250 to 2,500/K for reasons such as satisfying the parameters of the above equation (I). By setting the thermal expansion coefficient of the primary layer 11 to such a range, the degree of freedom of the primary layer 11 represented by the equation (I) can be within an appropriate range. The thermal expansion coefficient of the primary layer 11 may be measured by, for example, the method described in the following [Examples].

Further, the elastic modulus (primary elastic modulus) $P_{ISM}$ of the primary layer 11 for satisfying the parameters represented by the above equations (I) and (II) is preferably 0.2 to 3.0 MPa, but the elastic modulus $P_{ISM}$ is not particularly limited to such a range. In general, when the elastic modulus is increased, the thermal expansion coefficient decreases, and it is preferable to determine the elastic modulus $P_{ISM}$ of the primary layer 11 in consideration of the balance between the two.

Further, the elastic modulus (secondary elastic modulus) $S_{ISM}$ of the secondary layer 12 for satisfying the parameter represented by the equation (II) is preferably 2,000 MPa or less 2,000 MPa). By setting the elastic modulus of the secondary layer 12 to 2,000 MPa or less, the rigidity of the secondary layer 12 can be within an appropriate range. The elastic modulus of the secondary layer 12 is particularly preferably 500 to 2,000 MPa. The elastic modulus of each of the primary layer 11 and the secondary layer 12 may be measured by, for example, the method described in the following [Examples]. The elastic modulus of the primary layer 11 corresponds to the so-called In-situ Modulus (ISM), and the elastic modulus of the secondary layer 12 corresponds to the so-called 2.5% secant modulus.

In the present invention, the effective core cross-sectional area (effective core cross-sectional area) $A_{eff}$ of the optical fiber 10 is preferably larger than 100 $\mu m^2$ (>100 $\mu m^2$). In the optical fiber 10, $A_{eff}$ is an index of the microbend sensitivity, and the larger the value, the higher the microbend sensitivity (generally, it is said that the microbend sensitivity is high when $A_{eff}$>100 $\mu m^2$). Therefore, if $A_{eff}$ is larger than 100 $\mu m^2$, the optical fiber 10 has high microbend sensitivity, and the present invention can cope with such a case. The effective core cross-sectional area (effective core cross-sectional area) $A_{eff}$ is particularly preferably 130 $\mu m^2$ or more (≥130 $\mu m^2$).

The effective core cross-sectional area (effective core cross-sectional area) $A_{eff}$ is expressed by the equation of $(MFD)^2 \pi \times k/4$ (MFD is a mode field diameter ($\mu m$), and k is a constant), and, for example, it is described in C-3-76 and C-3-77 of Proceedings of the Electronics Society Conference of IEICE in 1999.

In the present invention, as described above, by satisfying the equations (I) and (II), the transmission loss can be suppressed even when an optical fiber having high microbend sensitivity is used. However, regarding the suppression of the transmission loss (microbend loss), in a case of using an optical fiber 10 having an effective core cross-sectional area $A_{eff}$, which is described later, larger than 100 $\mu m^2$ at a wavelength of 1,550 nm (1.55 $\mu m$) (that is, an optical fiber 10 having high microbend sensitivity), the loss level of the transmission loss at a wavelength of 1,550 nm can be suppressed to 1.0 dB/km or less, and in a case of using an optical fiber 10 having an effective core cross-sectional area $A_{eff}$ of 100 $\mu m^2$ or less, the loss level of the transmission loss can be suppressed to 0.1 dB/km or less.

The coating thickness P of the primary layer 11 is preferably 10 to 60 $\mu m$, and the coating thickness S of the secondary layer 12 is preferably 10 to 60 $\mu m$. The thickness of each layer is not limited to these values and can be changed optionally.

The ratio (S/P) of the coating thickness S of the secondary layer 12 to the coating thickness P of the primary layer 11 is preferably less than 1 (<1). If the ratio is less than 1 (that is, the primary layer 11 is thicker than the secondary layer 12), the secondary layer 12 is relatively flexible, which leads to the primary layer 11 becoming easier to move, so that the transmission loss can be effectively suppressed.

The elastic moduli of the primary layer 11 and the secondary layer 12 and the thermal expansion coefficient of the primary layer 11 are adjusted by, for example, adjusting the components such as the ultraviolet curable resin constituting the primary layer 11 and the secondary layer 12 and the manufacturing conditions of these layers.

Specifically, the elastic moduli of the primary layer 11 and the secondary layer 12 can be adjusted depending on the type, molecular weight, and content of the oligomer, the type and addition amount of the diluted monomer, or the types and contents of other components, or the ultraviolet curing conditions such as the irradiation intensity in the ultraviolet curable resin and the like constituting the primary layer 11 and the secondary layer 12.

For example, the elastic modulus can be increased by reducing the molecular weight of the oligomer or increasing the content or functional groups of the diluting monomer to be added, so that these may be used as parameters for adjustment. On the other hand, in this way, the crosslink density becomes high and the shrinkage also becomes significant, so that it is preferable to adjust these in consideration of the balance.

(2) Manufacturing Method for Coated Optical Fiber 1:

An example of a manufacturing method for the coated optical fiber 1 according to the present invention will be described. In the following, the glass optical fiber 10 will be described as an example of the optical fiber 10.

To manufacture the coated optical fiber 1, for example, first, a preform containing silica glass as a main component is heated and melted by a drawing furnace (not shown) to obtain the silica glass optical fiber (glass optical fiber 10).

Next, liquid ultraviolet curable resin is applied to the glass optical fiber 10 using a coating die, and subsequently, ultraviolet rays are applied to the ultraviolet curable resin applied by an ultraviolet irradiation device (UV irradiation device) (not shown) to cure such a component. In this way, the coated optical fiber 1 in which the glass optical fiber 10 is coated with the primary layer 11 and the secondary layer 12 is manufactured. After drawing, the ultraviolet curable resin is immediately coated on the outer periphery of the glass optical fiber 10 to form the primary layer 11 and the secondary layer 12, which can prevent a decrease in strength of the obtained coated optical fiber 1.

In the present invention, it is preferable to control the type of the ultraviolet curable resin and the ultraviolet irradiation intensity during curing treatment as appropriate so that the thermal expansion coefficient and the elastic modulus of the primary layer 11 and the elastic modulus of the secondary layer 12 fall within predetermined ranges.

(3) Effect of Invention:

In the coated optical fiber 1 according to the present invention described above, the degree of freedom of the primary layer 11 represented by the equation (I) and the rigidity of the secondary layer 12 represented by the equation (II) are set in specific ranges, respectively. Thus, the coated optical fiber 1 is provided, which can suppress the transmission loss even when the optical fiber 10 having high microbend sensitivity such as the BI fiber having a large effective core cross-sectional area $A_{\it eff}$ of an optical fiber is used. The present invention can be widely used as a coated optical fiber 1 constituting a coated optical fiber ribbon or as a coated optical fiber 1 housed in an optical fiber cable.

The optical fiber cable constituted by including the coated optical fibers 1 according to the present invention enjoys the effects of the above-described coated optical fiber 1. That is, the present invention provides an optical fiber cable including the coated optical fibers 1 capable of suppressing the transmission loss even when the optical fiber 10 having high microbend sensitivity such as the BI fiber having a large effective core cross-sectional area $A_{\it eff}$ of an optical fiber is used.

The configuration of the optical fiber cable is not particularly shown, and, for example, can be like a conventionally known optical fiber cable such as a configuration including the coated optical fibers 1 according to the present invention, in which an outer skin (sheath) is coated on the outer periphery thereof. The configuration is not particularly limited. The configuration of the optical fiber cable is freely selectable, and can be, for example, a configuration including the coated optical fibers 1, and tension members arranged on both sides of the coated optical fibers 1 in parallel with the coated optical fibers 1 in the longitudinal direction, in which an outer skin (sheath) is coated on the outer periphery of the coated optical fibers 1 and the like. Therefore, a configuration of a conventionally known optical fiber cable can be used, including configurations other than those described above.

Further, for example, a configuration of a so-called optical fiber drop cable in which a pair of notches formed in the longitudinal direction are formed on both sides of the optical fiber cable, and a support portion having a built-in support wire is arranged as necessary may be used.

The configuration of the optical fiber cable is not limited to the above configurations, and for example, the type and thickness of the material constituting the outer skin (sheath), the number and size of the coated optical fibers 1, and the type, number, and size of the tension members can also be freely selected. Further, the outer diameter and cross-sectional shape of the optical fiber cable, the shape and size of the notches, the presence or absence of the notch formation, and the like can also be freely selected.

(4) Modification of Embodiment:

It should be noted that the above-described aspect shows one aspect of the present invention, and the present invention is not limited to the above-described embodiment. It is needless to say that modifications and improvements that include the configurations of the present invention and are made within the range in which the object and effects of the present invention can be achieved are included in the contents of the present invention. Further, the specific structure, shape, and the like in carrying out the present invention may be any other structure, shape, and the like within the range in which the object and effects of the present invention can be achieved. The present invention is not limited to the above-described embodiment, and modifications and improvements made within the range in which the object of the present invention can be achieved are included in the present invention.

For example, in the above-described embodiment, the configuration of the coated optical fiber 1 has been described by showing the configuration in which the primary layer 11 is formed around the optical fiber 10, the secondary layer 12 is formed around the primary layer 11, and the primary layer 11 and the secondary layer 12 are formed in this order. However, a colored layer 13 may be formed around the secondary layer 12 (referred to as a colored coated optical fiber 1).

Figure 2:
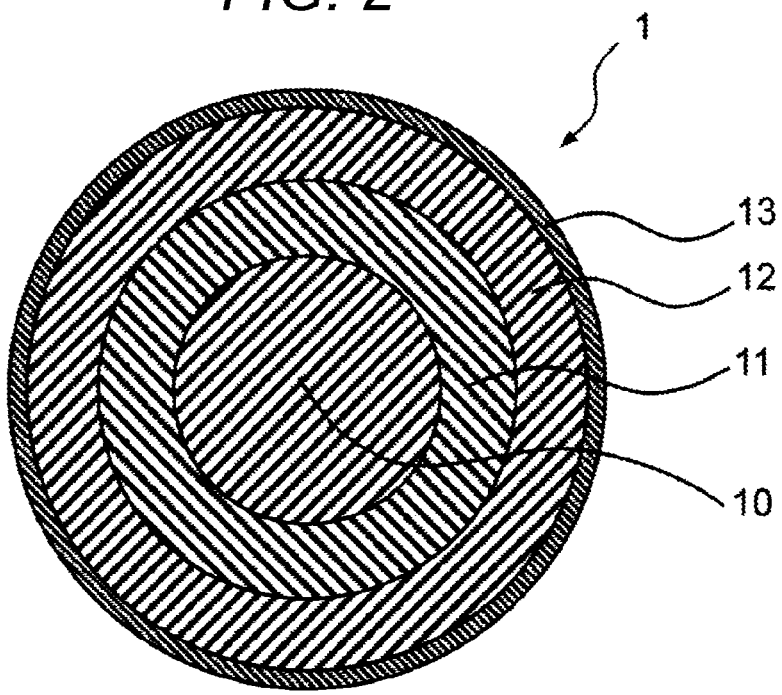
FIG. 2 is a cross-sectional view showing another example of the structure of the coated optical fiber.

FIG. 2 is a cross-sectional view showing another example of the structure of the coated optical fiber 1. In the configuration shown in FIG. 2 in which the colored layer 13 is formed around the secondary layer 12 to form the colored coated optical fiber 1, as the constituent material of the colored layer 13, the ultraviolet curable resin mentioned above as the components constituting the primary layer 11 and the secondary layer 12, for example, oligomer, diluting monomer, photoinitiator, silane coupling agent, sensitizer, pigment, lubricant, and the components of the various additives described above can be preferably used.

Even in the configuration shown in FIG. 1, the secondary layer 12 may be colored to form a colored secondary layer 12 as the outermost layer of the coated optical fiber 1. When the secondary layer 12 is colored, the colored secondary layer 12 can be obtained by adding a coloring material mixed with pigment, lubricant, or the like to the secondary layer 12.

The content of the coloring material in the colored secondary layer 12 may be appropriately determined depending on the content of the pigment contained in the coloring material, the type of other components such as the ultraviolet curable resin, and the like.

In addition, the specific structure, shape, and the like when the present invention is carried out may be other structures and the like within the range in which the object of the present invention can be achieved.

EXAMPLES

Hereinafter, the present invention will be described in more detail based on Examples and Comparative Examples, but the present invention is not limited thereto.

Examples 1 to 7, Comparative Examples 1 and 2

Manufacture of Coated Optical Fiber:

Using three types of optical fibers including optical fibers considered to have high microbend sensitivity as optical fibers (Examples 1 to 6 and Comparative Example 1 in which $A_{\it eff}$ is larger than 100 $\mu m^2$) with the fiber effective cross-sectional area $A_{\it eff}$ ($\mu m^2$), the coating thickness P ($\mu m$) of the primary layer, and the coating thickness S ($\mu m$) of the secondary layer shown in Table 1, the primary layer and the secondary layer were coated around the glass optical fiber made of silica glass in this order so as to have the coating thicknesses (P ($\mu m$), S ($\mu m$)) shown in Table 1, thereby manufacturing coated optical fibers having the configurations shown in FIG. 1.

The primary layer and the secondary layer were manufactured using commercially available ultraviolet curable resin (oligomer, diluted monomer, photoinitiator, silane coupling agent, sensitizer, lubricant, or the like). The elastic moduli of the primary layer and the secondary layer and the thermal expansion coefficient of the primary layer, which were the parameters, were adjusted so as to have values shown in Table 1 by changing the ultraviolet curing conditions or the like depending on the type of the ultraviolet curable resin and the ultraviolet irradiation conditions (for example, the weight average molecular weight and content of the oligomer constituting the ultraviolet curable resin, the type, number, and content of functional groups in the dilute monomer, the type of the photoinitiator, the ultraviolet irradiation intensity, or the like).

Specifically, Examples 1 to 4 and Comparative Example 1 were manufactured using common materials for the primary layer and the secondary layer, and changing (adjusting) the coating thicknesses and manufacturing conditions of the primary layer and the secondary layer (the ultraviolet irradiation intensity or the like, the same applies hereinafter to the manufacturing conditions). Examples 5 and 6 were manufactured using a common material for the primary layer, changing the material and the coating thickness of the secondary layer, and changing the manufacturing conditions. Example 7 and Comparative Example 2 were manufactured by changing the materials and the coating thicknesses of the primary layer and the secondary layer under common manufacturing conditions.

Test Example 1

Regarding the obtained coated optical fibers of Examples 1 to 7 and Comparative Examples 1 and 2, "(1) elastic modulus of primary layer", "(2) elastic modulus of secondary layer", "(3) thermal expansion coefficient of primary layer", and "(4) transmission loss (microbend loss)" were measured using the measurement methods shown below. The results are shown in Table 1.

(1) Elastic Modulus of Primary Layer:

The elastic modulus (In-situ Modulus: ISM) of the primary layer was measured by the following method. First, a few mm of the primary layer and the secondary layer in the middle part of the optical fiber were peeled off using a commercially available stripper, and then one end of the optical fiber on which the coating was formed was fixed on a slide glass with an adhesive, and a load F was applied to the other end of the optical fiber on which the coating was formed. In this state, a displacement $\delta$ of the primary layer at the boundary between the portion where the coating was peeled off and the portion where the coating was formed was read with a microscope. In addition, by setting the load to be applied to 10, 20, 30, 50, and 70 gf (98, 196, 294, 490, 686 (mN) in that order), a graph of the displacement with respect to the load was created. Then, the slope obtained from the graph and the elastic modulus (primary elastic modulus) $P_{ISM}$ of the primary layer were calculated using the following equation (X).

[Math. 3]

$$P_{ISM} = (3F/\delta) \times (1/2\pi l) \ln(D_P/D_G) \tag{X}$$

Here, $P_{ISM}$ is the elastic modulus (MPa) of the primary layer, $F/\delta$ is the slope shown in the graph of the displacement ($\delta$) with respect to the load (F), l is the sample length (for example, 10 mm), and $D_P/D_G$ is the ratio of the outer diameter ($D_P$) (μm) of the primary layer to the outer diameter ($D_G$) (μm) of the optical fiber. The outer diameter of the primary layer and the outer diameter of the optical fiber were measured by observing the cross section of the optical fiber cut by a fiber cutter with a microscope (refer also to the item (3) described later).

(2) Elastic Modulus of Secondary Layer:

An optical fiber was immersed in liquid nitrogen and the coating was peeled off with a stripper to prepare a sample having only the coating in which the glass optical fiber is pulled out from the optical fiber, and the end portion of the sample was fixed to an aluminum plate with an adhesive. The aluminum plate portion was chucked using a Tensilon universal tensile tester in an atmosphere with a temperature of 23° C. and a relative humidity of 50%. Next, by pulling the sample at a marked line spacing of 25 mm and a tensile speed of 1 mm/min and measuring the force at 2.5% elongation, the elastic modulus (secondary elastic modulus) $S_{ISM}$ (2.5% secant modulus) of the secondary layer was calculated.

(3) Thermal Expansion Coefficient of Primary Layer:

The calculation method of the thermal expansion coefficient of the primary layer (volume thermal expansion coefficient of −50° C. to 25° C.) is described below (specifically, the calculation is performed according to the description in the Furukawa Electric review No. 122 (September 2008), "A Study for Estimating Thermal Strain and Residual Stress in Optical Fiber Coatings", "4-3". The outline is shown below). First, two types of coating samples were prepared for the primary layer. One is a sample in which a primary layer and a secondary layer are coated on a glass optical fiber (hereinafter referred to as "fiber sample"), and the other is a sample having only a coating layer in which a glass optical fiber is removed from a coated optical fiber (hereinafter referred to as "tube coating sample (tube sample)").

For the measurement of the thermal expansion coefficient, a commercially available TMA thermomechanical analysis (Mettler Toledo TMA40) was used to measure the longitudinal direction and the outer diameter direction. The measurement conditions are such that the applied load is 0 load, the temperature range is −10° C./min at cooling rate at 25° C. to −100° C., the holding time is 10 minutes at −100° C., and the temperature rise rate is 10° C./min at −100° C. to 100° C.

Regarding the longitudinal direction, the measurement was performed using a tube coating sample (tube sample) in a tensile mode, and regarding the outer diameter direction, the measurement was performed using a fiber sample and the tube coating sample (tube sample) in a compression mode.

Then, the relationship between the measured temperature and linear expansion rate in the longitudinal direction and the relationship between the measured temperature and linear expansion rate in the outer diameter direction were graphed. Since the linear expansion coefficient of the coating layer changes significantly near the glass transition temperature ($T_g$) of the coating layer, in this measurement, −50° C., which is near the glass transition temperature of the primary layer, is defined as a reference, and each linear expansion coefficient is determined from the slope of the temperature range of −50° C. to 25° C., which is the range in which the measurement result changes linearly.

The thermal expansion coefficients (volume thermal expansion coefficients of −50° C. to 25° C.) of the primary layer and the secondary layer were estimated from the linear expansion coefficient of the tube coating sample (tube sample) in the tensile mode (longitudinal direction) and the linear expansion coefficient of each of the fiber sample and the tube sample in the compression mode (outer diameter direction).

Also, in order to calculate the thermal expansion coefficient of the primary layer (volume thermal expansion coefficient from −50° C. to 25° C., which is hereinafter simply referred to as a thermal expansion coefficient including the secondary layer), first, the thermal expansion coefficient of the secondary layer was calculated. Normally, the glass transition temperature of the primary layer is as low as −50° C. In the temperature range above the glass transition temperature such as −50° C. to 25° C., the primary layer of the tube coating sample (tube sample) is in a rubber state, and the elastic modulus is significantly smaller than that of the secondary layer, so that the secondary layer can expand and contract freely.

The thermal expansion coefficient of the secondary layer is determined by doubling the linear expansion coefficient in the outer diameter direction and adding the linear expansion coefficient in the longitudinal direction, and the thermal expansion coefficient of the secondary layer is determined by the following equation (Y). Here, $\beta_S$ is the thermal expansion coefficient (volume thermal expansion coefficient) (/K) of the secondary layer, $\alpha_{SL}$ is the linear expansion coefficient (/K) in the longitudinal direction of the secondary layer, and $\alpha_{SR}$ is the linear expansion coefficient (/K) in the outer diameter direction of the secondary layer.

[Math. 4]

$$\beta_S = \alpha_{SL} + (2 \times \alpha_{SR}) \quad (Y)$$

Regarding the obtained fiber sample, since the primary layer is adhered to the optical fiber, the secondary layer cannot freely expand and contract, so that the thermal expansion of the coating layer is constrained by the optical fiber. Further, since the thermal expansion coefficient of the silica glass constituting the optical fiber is significantly smaller than that of the coating layer, the thermal expansion can be ignored. From the above, the thermal expansion coefficient of the primary layer (volume thermal expansion coefficient at −50° C. to 25° C.) was calculated from the following equation (Z).

In the equation (Z), $\beta_P$ is the thermal expansion coefficient of the primary layer (volume thermal expansion coefficient) (/K), $\beta_S$ is the thermal expansion coefficient of the secondary layer (volume thermal expansion coefficient) (/K) (calculated by the equation (Y)), $\alpha_{FR}$ is the linear expansion coefficient in the outer diameter direction of the fiber sample (/K), $D_G$ is the outer diameter of the optical fiber (about 125 µm), $D_P$ is the outer diameter of the primary layer (µm), and $D_S$ is the outer diameter of the secondary layer (µm) (the outer diameter of the primary layer is calculated by "outer diameter of optical fiber+(coating thickness of primary layer×2)", and the outer diameter of the secondary layer is calculated by "outer diameter of primary layer+(coating thickness of secondary layer×2)").

[Math. 5]

$$D_G + (D_P - D_G) \times (1 + (\beta_P/2)) + (D_S - D_P) \times (1 + (\beta_S/2)) = D_S \times (1 + \alpha_{FR}) \quad (Z)$$

(4) Transmission Loss (Microbend Loss):

The transmission loss was measured and the microbend resistance was evaluated. IEC TR62221 (fixed drum method) was used as the method for measuring the transmission loss. Specifically, first, a mesh of #150 was wound around a drum of φ400 mm, and a coated optical fiber of 850 m was wound thereon in a single layer with a tension of 1 N, and the transmission loss after being left for 24 hours was measured. Then, the value obtained by subtracting the transmission loss in the bundled state (the state in which the mesh was not wound around the drum) from the obtained transmission loss was defined as the transmission loss (microbend loss).

The transmission loss was measured by measuring the transmission loss at a wavelength of 1,550 nm (1.55 µm), and the criteria for determination was such that, regarding Examples 1 to 4 and Comparative Example 1 in which the effective core cross-sectional area $A_{eff}$ of the optical fiber was 150 µm², and Examples 5 and 6 in which the effective core cross-sectional area $A_{eff}$ of the optical fiber was 130 µm², the transmission loss (microbend loss) due to microbend at a wavelength of 1,550 nm was 1.0 dB/km or less (the case of 1.0 dB/km or less was determined to be passed, and the case of exceeding 1.0 dB/km was determined to be failed). Further, the criteria for determination was such that, regarding Example 7 and Comparative Example 2 in which the effective core cross-sectional area $A_{eff}$ of the optical fiber was 85 µm², the transmission loss was 0.1 dB/km or less (the case of 0.1 dB/km or less was determined to be passed, and the case of exceeding 0.1 dB/km was determined to be failed).

(Configurations and Results)

TABLE 1

| | Fiber Effective Cross-sectional Area | Coating Thickness | | Elastic Modulus | | Thermal Expansion Coefficient of Primary Layer | Rigidity of Secondary Layer (Equation (II)) | Degree of Freedom of Primary Layer | Transmission Loss (Microbend Loss: @ 1,550 nm) |
|---|---|---|---|---|---|---|---|---|---|
| | $A_{eff}$ µm² | P µm | S µm | $P_{ISM}$ MPa | $S_{ISM}$ MPa | $\beta_P$ /K | $(S_{ISM}/P_{ISM})$ × — | $P_{ISM}$ × $B_P$ × MPa/K | dB/km |
| Comparative Example 1 | 150 | 45 | 21 | 0.92 | 2003 | 650 | 1019 | 598 | 1.09 |
| Example 1 | 150 | 46 | 22 | 1.28 | 1545 | 702 | 569 | 899 | 0.94 |
| Example 2 | 150 | 45 | 21 | 1.10 | 1453 | 1072 | 627 | 1180 | 0.88 |
| Example 3 | 150 | 46 | 20 | 1.29 | 792 | 1458 | 265 | 1883 | 0.47 |
| Example 4 | 150 | 44 | 22 | 1.33 | 195 | 1986 | 73 | 2640 | 0.22 |
| Example 5 | 130 | 41 | 24 | 0.75 | 1095 | 889 | 881 | 662 | 0.29 |
| Example 6 | 130 | 41 | 25 | 0.94 | 1299 | 741 | 819 | 697 | 0.07 |
| Comparative Example 2 | 85 | 30 | 29 | 0.52 | 650 | 782 | 1190 | 406 | 0.19 |
| Example 7 | 85 | 35 | 23 | 0.68 | 1001 | 1005 | 991 | 681 | 0.08 |

As shown in Table 1, the coated optical fibers of Examples 1 to 7 that satisfy the equations (I) and (II) could suppress the transmission loss (microbend loss) even when an optical fiber having high microbend sensitivity was used as the optical fiber such that the transmission loss was 1.0 dB/km or less in Examples 1 to 6. Further, the transmission loss was 0.1 dB/km or less in Example 7, and also in this case, the transmission loss could be suppressed. On the other hand, the coated optical fibers of Comparative Examples 1 and 2 that do not satisfy the equations (I) and (II) could not suppress the transmission loss such that the transmission loss exceeded 1.0 dB/km in Comparative Example 1 and exceeded 0.1 dB/km in Comparative Example 2.

Although the case where the outer diameter of the optical fiber is 125 μm has been described as the present embodiment, the present invention is not based on this, and can be applied to, for example, an optical fiber having an outer diameter of 80 to 125 μm.

INDUSTRIAL APPLICABILITY

The present invention can be effectively used as a means for providing a coated optical fiber including an optical fiber having high microbend sensitivity and an optical fiber cable including the coated optical fibers, and has high industrial applicability.

REFERENCE SIGNS LIST 1 coated optical fiber (colored coated optical fiber)
10 optical fiber
11 primary layer (primary coating layer)
12 secondary layer (secondary coating layer)
13 colored layer

What is claimed is:

1. A coated optical fiber in which a primary layer that covers an optical fiber is formed around the optical fiber, and a secondary layer that covers the primary layer is formed around the primary layer, the primary layer and the secondary layer being formed in this order,
    wherein, when a coating thickness of the primary layer is P (μm),
    a coating thickness of the secondary layer is S (μm),
    a thermal expansion coefficient of the primary layer is $\beta_P$ (/K),
    an elastic modulus (primary elastic modulus) of the primary layer is $P_{ISM}$ (MPa), and
    the $P_{ISM}$ (MPa) is 0.2 to 3 MPa,
    an elastic modulus (secondary elastic modulus) of the secondary layer is $S_{ISM}$ (MPa), a relationship of the following equations (I) and (II) is established.

[Math. 1]

$$\beta_P \times P_{ISM} \geq 600 \tag{I}$$

$$(S/P) \times (S_{ISM}/P_{ISM}) \leq 1{,}000 \tag{II}.$$

2. The coated optical fiber according to claim 1, wherein an effective core cross-sectional area $A_{eff}$ of the optical fiber is larger than 100 μm².

3. The coated optical fiber according to claim 1, wherein a ratio (S/P) of the coating thickness S of the secondary layer to the coating thickness P of the primary layer is less than 1.

4. The coated optical fiber according to claim 1, wherein the elastic modulus (secondary elastic modulus) $S_{ISM}$ of the secondary layer is 2,000 MPa or less.

5. An optical fiber cable comprising the coated optical fiber according to claim 1.

6. The coated optical fiber according to claim 2, wherein an effective core cross-sectional area $A_{eff}$ of the optical fiber is larger than 130 μm².

* * * * *